US008539235B2

(12) United States Patent
Garcia Morchon et al.

(10) Patent No.: US 8,539,235 B2
(45) Date of Patent: Sep. 17, 2013

(54) METHOD FOR OPERATING A NETWORK, A SYSTEM MANAGEMENT DEVICE, A NETWORK AND A COMPUTER PROGRAM THEREFOR

(75) Inventors: Oscar Garcia Morchon, Eindhoven (NL); Bozena Erdmann, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 197 days.

(21) Appl. No.: 13/122,767

(22) PCT Filed: Sep. 28, 2009

(86) PCT No.: PCT/IB2009/054229
§ 371 (c)(1),
(2), (4) Date: Apr. 6, 2011

(87) PCT Pub. No.: WO2010/041164
PCT Pub. Date: Apr. 15, 2010

(65) Prior Publication Data
US 2011/0197064 A1    Aug. 11, 2011

(30) Foreign Application Priority Data

Oct. 6, 2008   (EP) ..................................... 08305644

(51) Int. Cl.
*H04L 9/32*          (2006.01)

(52) U.S. Cl.
USPC ........... 713/168; 380/278; 380/279; 380/284; 726/1

(58) Field of Classification Search
USPC .......................................................... 713/168
See application file for complete search history.

(56) References Cited

U.S. PATENT DOCUMENTS 5,202,921 A * 4/1993 Herzberg et al. ............. 713/162
6,240,188 B1 * 5/2001 Dondeti et al. ............... 380/284

(Continued)

FOREIGN PATENT DOCUMENTS

EP         0511483 A2   4/1992
WO   WO2006131849 A2   12/2006

(Continued)

OTHER PUBLICATIONS

Alaeksandar Melinkovic et al., "Wireless Sensor Networks for Personal Health Monitoring: Issues and an Implementation", Computer Communications xxx (2006) xxx-xxx, www.sciencedirect.com.

(Continued)

*Primary Examiner* — Kambiz Zand
*Assistant Examiner* — Yonas Bayou
(74) *Attorney, Agent, or Firm* — Larry Liberchuk (57) ABSTRACT

The present invention relates to a method for operating a network comprising communicating devices representing nodes of the network. More precisely, the invention relates to a method for operating a network (1), comprising a node (D1) and a system management device (3), the system management device comprising a root keying material being a set of alpha-secure functions having a degree of complexity of, and the node being provided with a node keying material share of degree of complexity α derived from the root keying material. The method comprises the following steps, upon receipt at the system management device of a request for an external user (4) to gain access to the node (D1): the system management device generates an external user keying material share of degree of complexity α from the root keying material and an access identifier, the system management device generates an access keying material of degree of complexity less than α, from the external user keying material share and an identifier of the node, the system management device provides the external user with the access keying material share and the access identifier, the external user derives a key from the access keying material share, and transmitting this key and the access certificate to the node, the node computes a key from the access identifier and the node keying material share, and the node compares the key transmitted by the external user and the key computed by the node, so as to authenticate the external user.

14 Claims, 3 Drawing Sheets

(56) References Cited

U.S. PATENT DOCUMENTS

| | | | |
|---|---|---|---|
| 7,502,927 B2 * | 3/2009 | Trostle et al. | 713/163 |
| 7,774,837 B2 * | 8/2010 | McAlister | 726/15 |
| 8,180,060 B2 * | 5/2012 | Aizu et al. | 380/277 |
| 2005/0097317 A1 * | 5/2005 | Trostle et al. | 713/163 |
| 2005/0099974 A1 * | 5/2005 | Kats et al. | 370/328 |
| 2005/0162166 A1 * | 7/2005 | Gebhardt et al. | 324/318 |
| 2007/0271379 A1 | 11/2007 | Carlton | |
| 2008/0016550 A1 * | 1/2008 | McAlister | 726/1 |
| 2009/0103735 A1 * | 4/2009 | Aizu et al. | 380/278 |
| 2009/0129599 A1 * | 5/2009 | Garcia et al. | 380/279 |
| 2009/0264712 A1 * | 10/2009 | Baldus et al. | 600/300 |

FOREIGN PATENT DOCUMENTS

| | | |
|---|---|---|
| WO | WO2007149850 A2 | 12/2007 |
| WO | WO2008014432 A2 | 1/2008 |

OTHER PUBLICATIONS

Jens-Peter Redlich et al., "Secure Personal Area Networks (SPAN)", Computer Science Department Systems Architecture Group.

B. Clifford Neuman, "Proxy-Based Authorization and Accounting for Distributed Systems" Institute of Electrical and Electronics Engineers, Proceedings of the International Conference on Distributed Computing Systems, Pittsburgh, May 25-28, 1993; [Proceedings of the International Conference on Distributed Computing Systems], Los Alamitos, IEEE Comp. Soc. Press, US LNKD- DOI:10.1109/ICD vol. Conf. 13, May 25, 1993, pp. 283-291, XP010095707.

Jihoon Cho, "Practical and Robust Self-Keying Scheme for Personal Area Networks", Information Security Group, Univ. of London, Egham, Digital Information Management, 2007, ICDIM 2007, 2nd Int'l Conference, vol. 1, pp. 493-499.

Antonis Markopoulos et al., "Higher Layer Security Mechanisms in Personal Area Network (PAN)", National Technical University of Athens, Dept. of Electrical & Computer Engineering, Telecommunications Laboratory, 157 73 Athens, Greece.

A. Wood et al., "Alarm-Net: Wireless Sensor Networks for Assisted-Living and Residential Monitoring", Dept. of Computer Science, University of Virginia, Wireless Sensor Network Research Group: http://www.cs.virginia.edu/wsn/.

Bao Shudi et al., "Authenticated Symmetric-Key Establishment for Medical Body Sensor Networks", Journal of Electronics (China), Science Press, Co-Published with Springer-Verlag GmbH, vol. 24, No. 3, May 2007, pp. 421-427.

Felix W.Y. Lau, "Pan Key: A Method to Create Secure Personal Area Networks for Impromptu Meetings", Master of Science, School of Computing Science, B.Sc., University of British Columbia, 1997, Library and Archives Canada, http://www.collectionscanada.gc.ca/obj/thesescanada/vol2/001/mr03483.pdf.

* cited by examiner

METHOD FOR OPERATING A NETWORK, A SYSTEM MANAGEMENT DEVICE, A NETWORK AND A COMPUTER PROGRAM THEREFOR

FIELD OF THE INVENTION

The present invention relates to a method for operating a network comprising communicating devices representing nodes of the network.

This invention finds an exemplary application in Personal Area Networks (PANs), comprising a collection of communicating entities situated, at least temporarily, within a user's personal area. A PAN comprises, for example, a plurality of wireless medical sensor nodes in or on the body of a user, and monitoring elements for monitoring vital signs of the user, or a plurality of electronic devices.

BACKGROUND OF THE INVENTION

Security is a fundamental requirement for networks of the like, or of any kind managing sensitive data, to ensure the secure information exchanged between the different nodes of the network, and also to control access to the network devices by other users, external to the network.

Accordingly, these networks require a security system taking into account several main issues:
- a trust issue, for providing means to the different nodes of a network for identifying, authenticating and trusting any other node as being a member of the same network,
- a secure communication issue, for providing means to enable secure communications between the different nodes of the network, and
- an access control issue, for providing a mechanism of restricted access to information or nodes of the network.

Conventional methods for operating such networks generally provide a master node, being a personal manager device or a trust center, used for pre-distributing cryptographic material to the nodes of the network, and then for authenticating each node as belonging to the network, when communications have to be established between the nodes. However, these methods have several drawbacks:
- first of all, these methods do not allow two nodes of the network to authenticate each other without referring to the master node, and
- in addition, since the cryptographic material is pre-distributed to the nodes of the network, it does not allow providing access to an external user of the network.

Besides, methods based on public-key cryptography have been proposed for granting access to external users of a network in a trustful and secure way. However, these methods are not resource-friendly from the computational point of view and require the transmission of long keys. Thus, these methods require communication, computation and memory capacities that are not always available in devices used in personal area networks, which are generally resource-constrained.

SUMMARY OF THE INVENTION

It is an object of the invention to propose a method for operating a network overcoming the drawbacks above-presented.

It is another object of the invention to propose a method for an external user to be granted access to a network while minimizing the communicational requirements in the network.

Still another object of the invention is to provide a method allowing minimizing computational requirements at the external user side.

Still another object of the invention is a method for allowing access for an external user to a network without endangering or having a consequence on the resiliency of the crypto elements of the network.

To this end, a method for operating a network comprising a node and a system management device is provided, the system management device comprising a root keying material being a set of alpha-secure functions having a degree of complexity of $\alpha$, and the node being provided with a node keying material share of degree of complexity $\alpha$ derived from the root keying material.

Such a method comprises the following steps, upon receipt at the system management device of a request for an external user to gain access to the node:
a) the system management device generating an external user keying material share of degree of complexity $\alpha$ from the root keying material and an access identifier,
b) the system management device generating an access keying material of degree of complexity less than $\alpha$, from the external user keying material share and an identifier of the node,
c) the system management device providing the external user with the access keying material share and the access identifier,
d) the external user deriving a key from the access keying material share, and transmitting this key and the access certificate to the node,
e) the node computing a key from the access identifier and the node keying material share, and
f) the node comparing the key transmitted by the external user and the key computed by the node, so as to authenticate the external user.

This method allows the node to authenticate the external user as being authorized by the system management device to have access to the node. As can be seen in steps d) to f), this authentication is performed without referring to the system management device, thus it can be carried out even if this device is offline.

Moreover, since the external user is provided only with an access keying material share of reduced complexity, the method allows maintaining the resiliency of the main crypto elements of the network. Indeed, the low complexity of the access keying material prevents an attacker from retrieving the root keying material, even if capturing an external user and compromising its access keying material share.

In a particular embodiment of the invention, the access identifier is the result of a hash function performed on an access certificate based on the request received by the system management device, and the node is provided with the hash function. In this embodiment, the node can verify the validity of the access certificate by computing the hash function of the access certificate and comparing the result with the received access identifier.

In a variant of this embodiment, step c) may further comprise the system management device providing the external user with the access certificate, and step d) further comprises the external user the access certificate to the node, It appears from the above that in this embodiment comprising verification of an access certificate, such verification is performed only after the end of authentication process. It means that the node verify the validity of the certificate only when it has made sure that the certificate has been provided by the system management device of the network.

In accordance to another aspect of the invention, a system management device is provided comprising a root keying material being a set of alpha-secure functions having a degree of complexity of α, the system management device being included in a network also comprising a node, and the system management device comprising:

means for, upon receipt of a request for an external user to gain access to the node generating an external user keying material share of degree of complexity α from the root keying material and an access identifier, means for generating an access keying material of degree of complexity less than α, from the external user keying material share and an identifier of the node, and the system management device providing the external user with the access keying material share and the access identifier.

In a particular embodiment of the invention, the system management device further comprises:

means for delegating access rights from a first node in the network to an external user so that the user can access a second node in the network without requiring communication with the system management device, and uncorrelation means to uncorrelate the keying material shares distributed to the nodes in the network so that an attacker cannot get any information from the keying material shares distributed to the nodes in the network but the nodes in the network can still verify the access and delegation certificates linked to the keying material shares distributed from the system management device.

In accordance to still another aspect of the invention, a network is provided, including a system management device according to the invention, and a communicating device representing a node of the network.

In accordance to still another aspect of the invention, a computer program is provided for implementing a method according to the invention.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

The present invention relates to a method for operating a network, for example a personal area network, comprising communicating devices.

Figure 1:
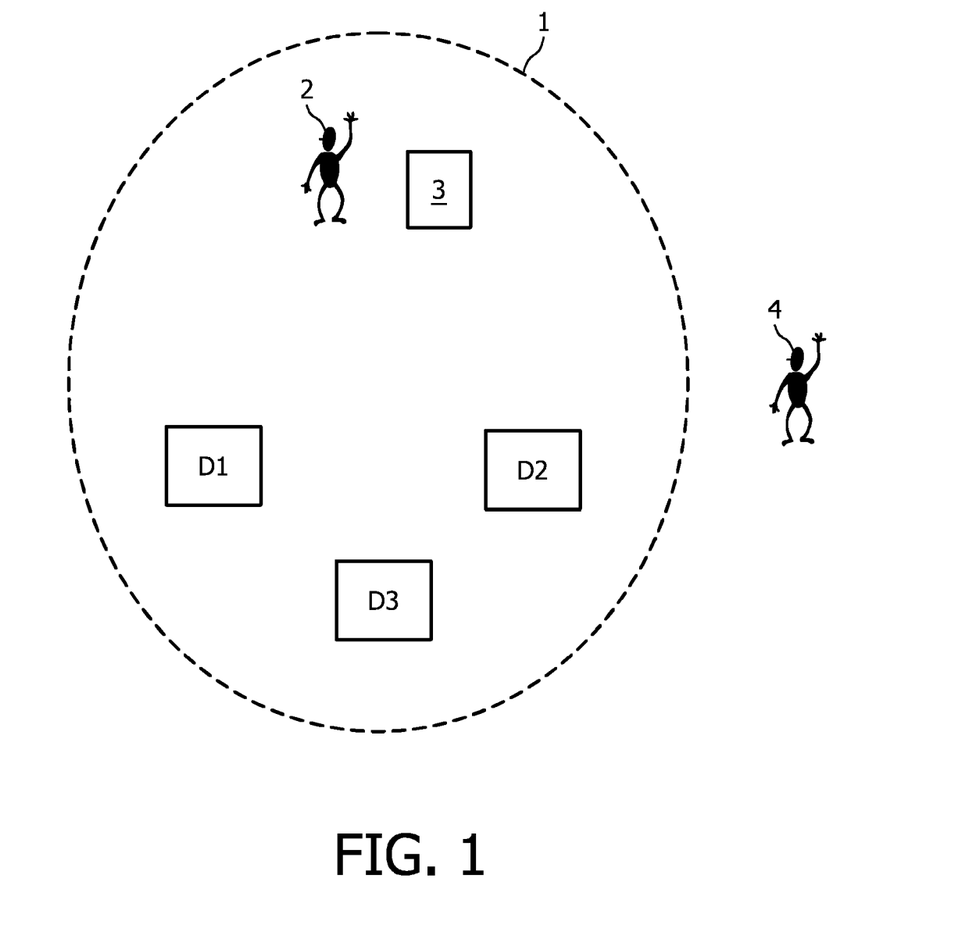
FIG. 1 is a personal area network operated with a method according to the invention.

FIG. 1 shows an exemplary network 1 in which a first embodiment of the invention can be implemented. This network 1 belongs to a user 2, provided with a communicating device 3, and several devices D1, D2, D3, representing nodes of the network. This network is a personal area network, which means that all the devices in the network belongs to the user 2, and thus the communicating device 3 is used as a system management device.

The system management device 3 is, for example, a mobile phone comprising a SIM card allowing generation and storing of cryptographic material.

The devices D1, D2 and D3 are, for example, in case of a medical network, body sensor nodes settled on or around the user 2's body or monitoring devices communicating with the sensor nodes for monitoring vital signs of the user.

In another example, D1, D2 and D3 are electronic devices such as a mobile phone, a music player, a video device, an electronic car system. In still another example, devices D1, D2 and D3 are home appliances or lighting equipments.

In both examples, it appears useful to get, in the network 1, the opportunity to give access to an external user 4 to one of the devices of the network. In the case of the medical network, the external user 4 may be a doctor, who needs to have access to a monitoring device for remotely checking the condition of the user 2. User 4 is provided with a communicating device for accessing a device of the network. In the rest of the specification, both the user and its communicating device will be designated under the reference "user 4".

In another example, the external user 4 may be a friend of user 2, who wants to have access to one device belonging to the user 2, e.g. for exchanging multimedia files.

Due to the sensitive applications of networks addressed in the present invention, these networks need to be provided with security systems for controlling access by an external user, as stated before, but also for securing communications between the nodes of the network.

In a method according to the first embodiment of the invention, a security system based on an alpha-secure key distribution system is used. In such a system, nodes do not share ready-made keys. Instead, nodes are provided with some node-specific information that allows them to compute a shared key with any other node in the network on input of that node's identifier. This node-specific information is derived from the root keying material provided by the system management device ($KM^{Root}$). The node-specific information is designated as a node keying material share, and denoted by $KM^{(i)}$ for node i.

Advantageously, the root keying material is a multivariate polynomial. Nodes receive polynomials shares generated from the multivariate polynomial. For instance, the multivariate polynomial might be a polynomial in two variables (x,y) of degree alpha, and the node keying material share is a monovariate polynomial of degree alpha, corresponding to the bivariate polynomial evaluating in a point corresponding to a node identifier.

For instance, it can be assume again that a symmetric bivariate polynomial f(x,y) is used as root keying material, and devices D1 and D2 in the network 1 of FIG. 1 carry the node keying material shares f(D1,y) and f(D2,y) respectively. When both nodes want to communicate, they obtain their corresponding identifiers, i.e., D2 obtains D1's identifier $ID^{D1}$=D1, and D1 obtains D2's identifier $ID^{D2}$=D2. Then, each node can generate a common key by evaluating its polynomial share in the identifier of the other device, i.e., node D1 evaluates its polynomial share f(D1,y) in y=D2 and node D2 evaluates f(D2,y) in y=D1. Therefore, both nodes agree on a common key K=f(D1,D2)=f(D2,D1). Finally, both nodes can use K to authenticate one to each other, for example by means of a challenge-response authentication handshake, or derive a session key to enable confidentiality.

Such a secure system offers a high resiliency under attack when two nodes belonging to the network are communicating. The present method of operating a network derives from this alpha-secure system, for providing an access control protocol for granting access to users who do not belong to the network, and thus who are not initially provided with keying material share.

Since the user 4 does not belong to the network 1, it is necessary to identify him and authenticate him so as to ensure security against attacks. Accordingly, when a user requests an access to a node of a network, it is necessary that the system management device 3 of the system generates an access identifier in response to this request, to allow the user 4 to deal directly with the node of the network he wants to access.

Figure 2:
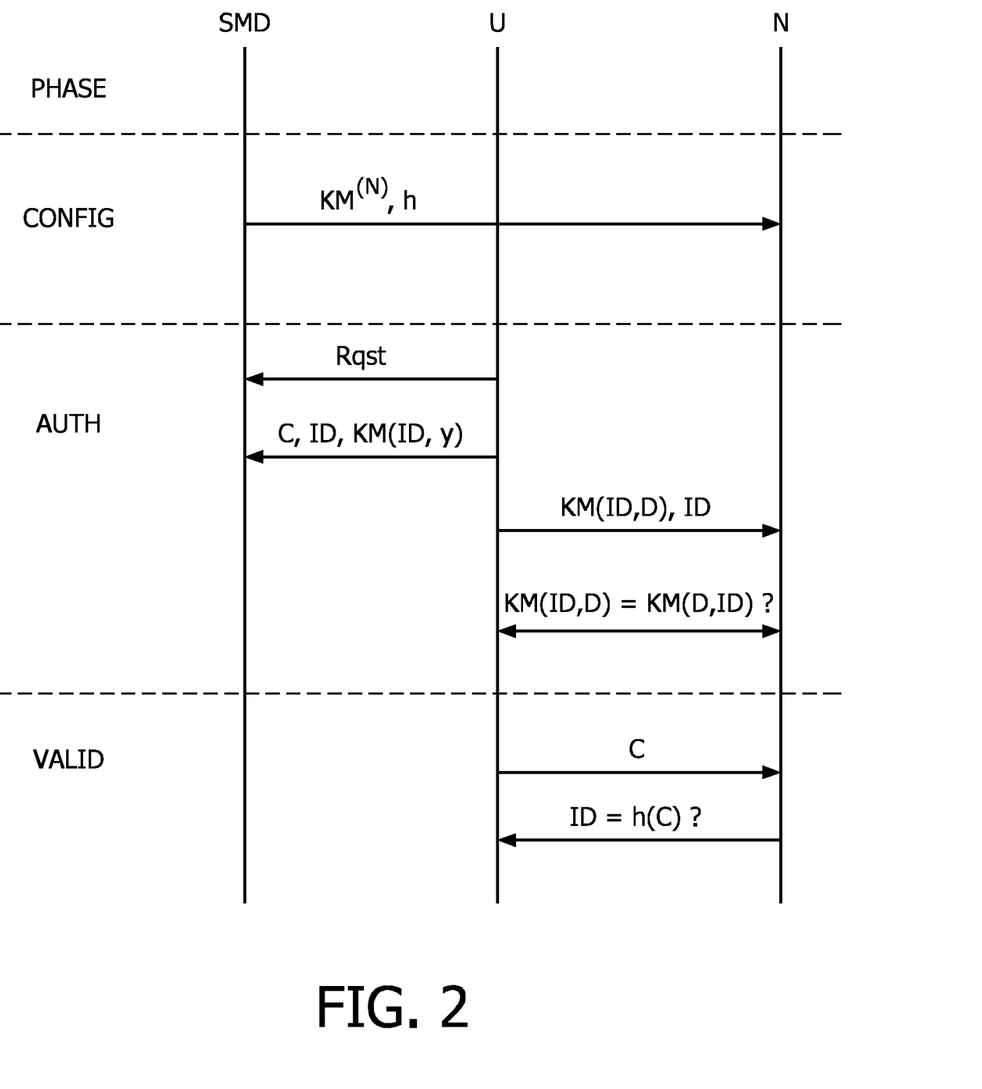
FIG. 2 is a diagram describing a sequence of a method according to the invention.

Such a protocol of authentication and access granting is described more precisely with reference to FIG. 2, representing an operating sequence of the different steps performed by a system management device SMD, an external user U and a node N while carrying out a method according to the invention. In the following description, the name of the node and an identifier of the node will be both designated by N.

The system management device is a device comprising means for generating and storing keying materials, for generating, calculating and storing cryptographic functions such as hash functions, and for handling and transmitting these elements to other devices.

Figure 3:
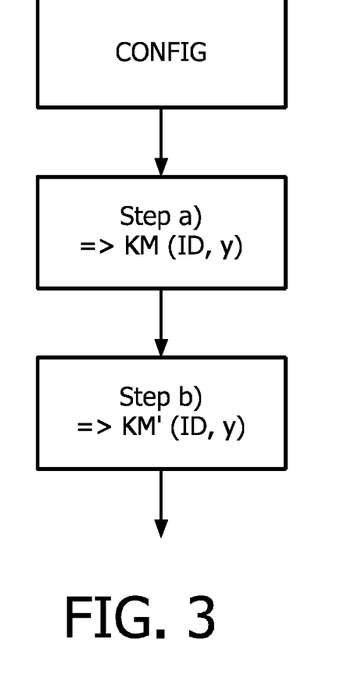
FIG. 3 is a block diagram detailing operations of a system management device according to the invention.

The sequence shown in FIG. 2 is divided into three phases. This sequence will also be described in connection with FIG. 3, showing the operations specifically performed by the system management device.

During the configuration phase CONFIG, the system management device generates a node keying material $KM^{(N)}$ from a root keying material, and a hash function h, which are transmitted to the node N.

Preferably, the root keying material is generated by the system management device, for example by means of a SIM card, under the form of a bivariate polynomial $$KM(x, y) = \sum_{\substack{j=0 \\ i=0}}^{\alpha} a_{i,j} x^i y^j.$$

Other forms of polynomial keying material might be used, such as a multivariate polynomial or a multitude of multivariate polynomials, for example to enable systems with a higher number of users according to the multivariate nature of polynomials. Polynomial keying material might also be masked with other cryptographic functions to protect the root keying material such as perturbation polynomials as known in the state of the art.

The node keying material $KM^{(N)}$ is then generated by evaluating $KM(x,y)$ at $x=N$. Thus, the node keying material $KM^{(N)}$ for node N is:

$$KM(N, y) = \sum_{j=0}^{\alpha} a_j y^j = (((a_\alpha y + a_{\alpha-1})y + a_{\alpha-2})y + \ldots)y + a_0$$

which is a monovariate polynomial of degree alpha.

The configuration phase may take place during the pre-deployment phase of the network, thus, once the network is deployed, the node is provided with its node keying material share.

During this configuration phase, the system management device also provides the node with a hash function, and may further provide it with other elements such as:
a crypto identifier,
a master secret for mutual authentication with the system management device,
some information regarding access control rights of the node to other nodes of the network.

The second phase shown on FIG. 2, AUTH, corresponds to the authentication of an external user sending a request for gaining access to the network.

User U sends a request Rqst to the system management device for requesting access to the node N. This request comprises the node N identifier, and, in some embodiments, also comprises other access attributes such as time information regarding a validity period requested, and a limited set of actions authorized for an external user. As an example, a user may send a request for being authorized to read some information collected by the node N, during 15 minutes.

Upon receipt of this request Rqst, the system management device first generates an access certificate C depending on part or all of the attributes of the request. A certificate might encode for example the access granted to a user for a limited period of time, C={user U is allowed to access node N for 15 minutes}.

Moreover, in case the request Rqst does not comprise any other attribute than the node identifier, the system management device may, in one embodiment, restrict anyway the access certificate to a predetermined period of time or to a limited set of actions, for example based on an access control policy previously established.

Based on the access certificate, the system management device generates an access identifier ID that is the hash of the access certificate, like ID=hash (C)=hash ({user U is allowed to access node N for 15 minutes}).

The system management device then generates, in step a), an external user keying material $KM^{(u)}$ by evaluating the root keying material $KM(x,y)$ at $x=ID$, thus obtaining $KM(ID, y)$ which is a monovariate polynomial of degree alpha.

For the external user to be authorized to access node N, the system management device must transmit all the cryptographic elements, namely the certificate C, the identifier ID, and the external user keying material share.

However, since $KM(ID,y)$ is a polynomial of degree alpha, $\alpha+1$ coefficients have to be transmitted to the user U, thus requiring large communication requirements. Accordingly, the present invention is such that, before transmitting the user keying material share to the user, the system management device, in step b), precomputes it, so as to decrease the degree of the polynomial, and thus the number of coefficients to be transmitted.

Such a precomputation is performed by evaluating $KM(ID, y)$ at $y=N$ several times. For example, performing the evaluation $\alpha-1$ times would result in an access keying material $$KM'(ID, y) = \underbrace{(((a_\alpha y + a_{\alpha-1})y + a_{\alpha-2})y + \ldots)y + a_0}_{y=D} =$$

$$\underbrace{(((a_\alpha D + a_{\alpha-1})D + a_{\alpha-2})D + \ldots)y + a_0}_{a_D}$$

Thus $KM'(ID,y)=a_D y+a_0$, which means that only two coefficients have to be transmitted to the user U.

In an advantageous embodiment, the precomputation is performed α times, which means that the access keying material transmitted to the user U is directly a key linked to the access certificate.

Once the access keying material precomputed, the system management device transmits to user U the following elements: C, ID and KM'(ID,y).

KM'(ID,y) is only a formal notation for distinguishing the precomputed polynomial from the user keying material KM(ID,y). Indeed, the complete computation of KM'(ID,y) to obtain a key provides the same result as a complete computation of KM(ID, y)

This transmission can be performed, for example, by using a short message service (SMS) provided in a telecommunication network. There, assuming that two coefficients of the polynomial have to be transmitted, the composition of the short message might be as follows:

| Size (bytes) | Field Name | Content |
| --- | --- | --- |
| 2 | Header | Protocol Identifier |
| 32 | ID | Access identifier |
| 64 | KM(ID, y) | Polynomial coefficients |
| 62 | C | Attributes encoded in the access certificate |

This message might thus be 160 bytes long, which makes it possible to encode it within a single short message, because a short message system (SMS) can encode message up to 160 characters. Thus, limiting the number of polynomial coefficients to be transmitted helps reducing the communicational requirements.

The transmission of the certificate might be carried out over any other wireless or wired medium to any kind of access such as access to a personal computer, electronic device or grant access to a facility.

Then, when the user wants to access the node N, it generates a key by evaluating the access identifier KM (ID, y) at y=N. It then transmits to the node N the key KM (ID, N) and ID. The node N, already provided with its node keying material share KM (N, y), evaluates it at y=ID, to obtain a key KM (N, ID).

The polynomials forming the keying material shares generated by the system management device in the present invention are symmetric, which means that they are such that KM(x,y)=KM(y,x).

Accordingly, the node N compares the key KM(ID,N) sent by the user U with the key KM(N,ID) computed, and if the keys are equal, it authenticates the user U, because it confirms that the cryptographic elements KM(ID, N) and ID have actually been provided to the user U by the system management device SMD. In another embodiment of the invention, the key KM(ID,N) might be used to launch an authentication protocol allowing both involved parties to prove the possession of a common secret KM(ID,N).

Once the authentication is performed, then user U may send, during a validation phase VALID, the certificate C to the node N. The node then verifies this access certificate by computing the hash function of the access certificate h(C) and by comparing the result with the received access identifier ID. In some embodiments, the certificate C may be transmitted at the same time as the access keying material KM(ID,D) and the identifier ID.

In describing this authentication process, it appears that another advantage of the precomputation of the user keying material share lies in the fact that it reduces the computation requirements of the user U for generating the key. In fact, the user only has to evaluate the access keying material a limited number of times. Namely, if the system management device, during precomputation, evaluates the user keying material $\alpha$-x times to generate the access keying material, then the user U only has to evaluate the access keying material x times to obtain the key. If x=$\alpha$, user U does not have to evaluate the access keying material at all.

Moreover, this precomputation allows increasing the security of the system because user U is provided with less information about the original root keying material, and the amount of information revealed by the capture of user U decreases when x increases.

Figure 4:
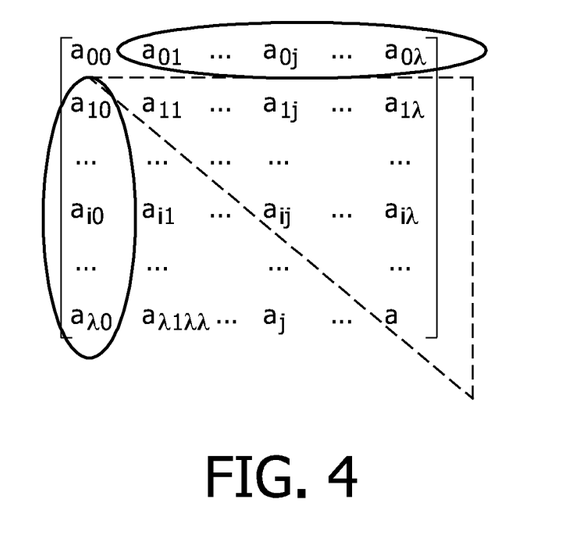
FIG. 4 is a matrix of coefficients of a bivariate polynomial used in one embodiment of the invention.

Let's assume that the system management device has root keying material comprising a single symmetric bivariate polynomial, f(x,y). Thus only $\alpha$+1 long keying material shares, f(ID, y) are needed to recalculate the original root keying material by using the following system of linear equations:

$$f(x, y) = \sum_{i,j=0}^{\lambda} a_{ij} x^i y^j$$

where $$\begin{bmatrix} a_{00} & a_{01} & \cdots & a_{0j} & \cdots & a_{0\lambda} \\ a_{10} & a_{11} & \cdots & a_{1j} & \cdots & a_{1\lambda} \\ \cdots & \cdots & \cdots & \cdots & & \cdots \\ a_{i0} & a_{i1} & \cdots & a_{ij} & \cdots & a_{i\lambda} \\ \cdots & \cdots & & \cdots & & \cdots \\ a_{\lambda 0} & a_{\lambda 1} & \cdots & a_{\lambda j} & \cdots & a_{\lambda\lambda} \end{bmatrix}$$

The matrix shown on FIG. 4 represents the polynomial coefficients of a bivariate polynomial. An attacker trying to crack the system by collecting access keying material shares has to take into account the following issues:

Cracking the lower coefficients in the matrix [$a_{00}$, $a_{01}$, $a_{0j}$, . . . , $a_{0\alpha}$,] requires the combination of the lower coefficients of $\alpha$+1 precomputed polynomials f'(ID, y). This allows solving a system of linear equations. These coefficients are encompassed in the below matrix by both ellipses.

Cracking the rest of coefficients in the matrix requires finding a total of $(\alpha^2-\alpha-2)/2$ different coefficients, namely the coefficients within the triangle. Due to the fact that the polynomial is symmetric, the coefficients in the above the matrix diagonal are equal to corresponding coefficients below matrix diagonal, i.e. $a_{ij}=a_{ji}$. The higher coefficient $a_D$ in the short polynomials f'(ID, y) depends on all these coefficients, therefore a total of $(\alpha^2-\alpha-2)/2$ short polynomials are needed to crack the system.

Consequently, an alpha-secure system supports the collusion of $(\alpha^2-\alpha-2)/2$ access keying material shares. This means a significant increment in the security level.

Moreover, using keying material share of a smallest degree of complexity, as in the present invention, allows a more convenient deployment of a network, e.g. a personal area network. For instance, we can imagine a user carrying a system management device SMD with root keying material and a parameter $\alpha$=100. We consider that the user's personal area network comprises 50 devices, each of which gets from the SMD of the user a normal set of cryptographic information, i.e., a certificate C, an identifier ID and the corresponding user keying material. The system management device can issue access keying material to grant special access rights to external users. Since 50 sets of user or node keying material have been already assigned, the system can still accommodate a number of (50^2−50−2)/2=1224 sets of access keying material without compromising the security of the system. A set of keying material corresponds, for example, to the set of coefficients of the polynomial corresponding to the keying material. Accordingly, a set of a user or node keying material is longer than a set of access keying material.

The present invention describes therefore an approach to enable access by distributing access control certificates based on polynomial keying material combining the certificate functionality of public-key cryptography with the low resource requirements of symmetric cryptography.

As previously mentioned, a method according to the invention may find application in very different application areas including:

Pervasive healthcare for medical monitoring, where a patient sets up its own secure body area network, e.g., by distributing sets of alpha-secure keying material to trusted clinicians/wellness coaches/family doctor;

Lighting personalization, where a user configures its lighting system by means of a configuration token so that only authorized people can modify the lighting settings.

Telecom applications, where a user uses his mobile phone as a system management device to configure the user's devices with alpha-secure keying material so that the mobile phone can authenticate and access resources in a device-to-device fashion, and the user can provide other people, for example a friend, with access keying material set linked to an access certificate over a secure link, e.g. in an SMS.

Within those application areas, several use cases are enabled by a method according to the invention, such as Securing PC login: a user A configures its PC with alpha-secure keying material and an access control policy by using the personal security manager. The user carries a token with a valid set of keying material and a lightweight digital certificate with administrator access rights. When the user is close to the PC, the user can automatically log in by means of the token Securing Body Sensor Network (BSN) configuration: a patient carries a BSN controlled by a system management device SMD. The SMD stores on a smart card some seeds for the generation of alpha-secure keying material root. The smart card also includes further information about the patient such as identifier or access control policies. The patient can use his SMD to control the devices or entities in network such as wireless sensor nodes, implants or authorize medical staff to have access to the system. The user can include a device or entity in his/her network by providing it with a set of node keying material and certificate C. After configuration, any pair of entities can authenticate each other as members of the patient's network. For instance, the patient might add two different clinicians A and B at different locations and times. Later, if necessary, both clinicians can authenticate each other as members of the user's network by using the sets of keying material and the certificates.

Telecom Applications: micropayment: Each of the payment terminals is configured with a node keying material share by the payment service operator (e.g. mobile network operator). A user willing to make a micropayment using his mobile phone receives an access keying material via a secure channel (e.g. SMS), partially pre-evaluated for the payment terminal the user is going to use.

A method according to the invention may also be applied in the case where the polynomials corresponding to the different keying materials are asymmetric polynomials for which $f(x,y) \neq f(y,x)$. Usage of asymmetric polynomials has the additional advantage of identifying and pre-authenticating the entity as a member of one of the two groups: devices getting the key material evaluated for the variable x or y, respectively; and limiting the secure key exchange to a pair of entities, of which each is a member of different group. This may be beneficial in some scenarios, e.g. user(s) versus payment terminal(s), user(s) vs. provider infrastructure.

In a particular embodiment of the invention, multivariate polynomials are used to enable delegation functionalities. There, root keying material comprises a multivariate keying material such as a multivariate polynomial and is handled by the system management device SMD. A first and second devices, or nodes, receive respective keying material shares derived from the multivariate keying material root from the SMD. The keying material share distributed to the first device might be used by the first device to access the second device. The first device might further generate a delegation keying material share from its keying material share encoding the actions that are delegated to a third device. The third device might use this delegation keying material share to prove its access rights to the second device. Such a delegation approach might be implemented by using a trivariate polynomial as root keying material. The first and second devices might receive bivariate polynomials shares generated from the trivariate polynomial by evaluated the first variable of the trivariate polynomial in a point depending on the identity of the corresponding devices. This identity might be generated from a certificate by means of a hash function. The first and second devices might agree on a common key by using their bivariate polynomial shares. The first device might generate a further delegation keying material share for a third device by evaluating its bivariate polynomial share in the second variable y in an identifier depending on the delegation rights assigned to the third device. The third device might use its delegation keying material received from the first device without intervention of the SMD to communicate with the second device.

Still another embodiment of a method according to the invention refers to the use of the polynomial keying material with uncorrelation methods that protect the root keying material from being cracked. Such uncorrelation methods might be used to achieve full-security in the use of polynomial-based certificates, polynomial-based access certificates and delegation approaches. An uncorrelation mechanism might be constructed by adding, to the keying material share of a node used to authenticate a polynomial-based certificate, an uncorrelation keying material, e.g., an uncorrelation polynomial, so that the node knows neither the node's keying material nor the uncorrelation polynomial. In the case of using uncorrelation polynomials, those polynomials are chosen in such a way that:

(i) they mask the polynomial shares distributed to nodes so that an attacker cannot gain any information from it and (ii) they do not interfere in the key generation process required in the verification of the access certificate. Consequently, the use of uncorrelation means allows for the deployment of polynomial-based certificates that are full secure.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communication and the art of transmitter power control and which may be used instead of or in addition to features already described herein.

The invention claimed is:

1. A method for operating a network, comprising a node and a system management device, the system management device comprising a root keying material being a set of functions each having a degree of complexity of $\alpha$, and the node being provided with a node keying material share having a degree of complexity of $\alpha$, the node keying material share being derived from the root keying material, the method comprising, upon receipt at the system management device of a request for an external user to gain access to the node:
   a) generating, by the system management device, an external user keying material share and an access identifier, the external user keying material share having a degree of complexity $\alpha$ and being generated from the root keying material;
   b) generating, by the system management device, an access keying material and an identifier of the node, the access keying material having a degree of complexity less than $\alpha$ and being generated from the external user keying material share;
   c) the system management device providing the external user with the access keying material share and the access identifier;
   d) the external user deriving a key from the access keying material share, and transmitting this key and the access identifier to the node;
   e) the node computing a key from the access identifier and the node keying material share; and
   f) the node comparing the key transmitted by the external user and the key computed by the node, so as to authenticate the external user.

2. The method of claim 1, wherein the access identifier is the result of a hash function performed on an access certificate based on the request received by the system management device, and the node being provided with the hash function, wherein step c) further comprises the system management device providing the external user with the access certificate, wherein step d) further comprises the external user transmitting the access certificate to the node, and the method further comprising:
   g) the node verifying the access certificate by computing the hash function of the access certificate and comparing the result with the received access identifier.

3. The method of claim 2, wherein the request received by the system management device comprises at least one access attribute, and the access certificate depends on this attribute.

4. The method of claim 3, wherein the access attribute comprises at least one of: a node identifier, a parameter defining a period of validity, a parameter defining a limited set of actions authorized for the external user.

5. The method of claim 1, wherein the root keying material is a bivariate polynomial of total degree alpha.

6. The method of claim 5, wherein step a) comprises evaluating a bivariate root keying material share at a first point corresponding to the access identifier, to obtain a monovariate polynomial of degree alpha corresponding to the user keying material, and step b) comprises b1) pre-computing, at least partly, the monovariate polynomial at a second point corresponding to the node identifier to obtain a monovariate polynomial of decreased degree.

7. The method of claim 6 wherein step b1) comprises computing the monovariate polynomial of degree $\alpha$ for a set of the highest degree coefficients at the second point.

8. The method as recited in claim 7, wherein $\alpha-1$ highest degree coefficients are computed.

9. The method of claim 1, wherein the root keying material and the access certificates are protected by means of uncorrelation methods.

10. The method of claim 1 wherein the system allows the delegation of access rights from a first node that got a keying material share from the system management device to a third node, so that the third device can access a second node that got keying material from the system management device.

11. A system management device comprising a root keying material being a set of functions having a degree of complexity of $\alpha+1$ in each variable, the system management device being included in a network also comprising a node, and the system management device comprising:
   a processor configured to
      generate an external user keying material share and an access identifier upon receipt of a request for an external user to gain access to the node, the external user keying material share having a degree of complexity $\alpha+1$ and being generated from the root keying material, and
      generate an access keying material and an identifier of the node, the access keying material having a degree of complexity less than $\alpha+1$ and being generated from the external user keying material share; and
   a transmitter configured to provide the external user with the access keying material share and the access identifier.

12. The system management device of claim 11, wherein the processor is further configured to:
   delegate access rights from a first node in the network to an external user so that the user can access a second node in the network without requiring communication with the system management device, and
   uncorrelate the keying material shares distributed to the nodes in the network so that an attacker cannot get any information from the keying material shares distributed to the nodes in the network but the nodes in the network can still verify the access and delegation certificates linked to the keying material shares distributed from the system management device.

13. A network comprising a system management device according to claim 1.

14. A computer tangible non-transitory medium configured to instruct a processor to perform a method, the method comprising:
   generating an external user keying material share and an access identifier upon receipt of a request for an external user to gain access to a node, the external user keying material share having a degree of complexity $\alpha+1$ and being generated from a root keying material;
   generating an access keying material and an identifier of the node, the access keying material having a degree of complexity less than $\alpha+1$ and being generated from the external user keying material share; and
   providing the external user with the access keying material share and the access identifier.

* * * * *